US010579780B1

(12) United States Patent
 Carlos et al.

(10) Patent No.: US 10,579,780 B1
(45) Date of Patent: Mar. 3, 2020

(54) SYSTEMS AND METHODS FOR DOCUMENT AUTHENTICATION

(71) Applicant: JPMorgan Chase Bank, N.A., New York, NY (US)

(72) Inventors: Edgardo S Carlos, Livingston, NJ (US); Eric-Andre Vigroux, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 14/979,687

(22) Filed: Dec. 28, 2015

Related U.S. Application Data

(60) Provisional application No. 62/096,542, filed on Dec. 24, 2014.

(51) Int. Cl.
 *G06F 21/31* (2013.01)
 *H04L 29/08* (2006.01)
 *H04N 5/225* (2006.01)

(52) U.S. Cl.
 CPC .............. *G06F 21/31* (2013.01); *H04L 67/06* (2013.01); *H04N 5/225* (2013.01)

(58) Field of Classification Search
 CPC .......... G06F 21/31; H04N 5/225; H04L 67/06
 USPC ...................................................... 726/26–30
 See application file for complete search history.

(56) References Cited

U.S. PATENT DOCUMENTS 8,688,579 B1 * 4/2014 Ethington .......... G06Q 20/0425
 705/42
8,832,805 B1 * 9/2014 McGilliard ............ H04L 63/10
 713/185
9,251,401 B1 * 2/2016 Koo .................... G06K 9/00288
2012/0179609 A1 * 7/2012 Agarwal .............. G06Q 20/042
 705/44
2012/0230577 A1 * 9/2012 Calman ................ G06Q 20/042
 382/138

(Continued)

OTHER PUBLICATIONS

Mohanna et al., "A mobile transaction processing system to improve concurrency in mobile database," 2013 IEEE International Conference on Computational Intelligence and Computing Research Year: 2013 | Conference Paper | Publisher: IEEE.*

(Continued)

*Primary Examiner* — Roderick Tolentino
(74) *Attorney, Agent, or Firm* — Greenblum & Bernstein, P.L.C.

(57) ABSTRACT

Embodiments of present invention are directed to document authentication based on video captures. Instructions may be generated to guide a remotely situated customer through an authentication process in which the customer presents a document (e.g., a driver license, passport, or payment card) to a video capture element of a personal computing device (e.g., a smart phone or tablet computer) in a specified manner so that identifiable feature(s) of that document can be captured in a video file. The video file may then be uploaded to a central server for further processing or archiving. The instructions that guide the customer through the document authentication steps may be either generated locally on the personal computing device via a mobile application or delivered from a remote computer via an Internet browser. With this technique, a banking customer need not physically visit a bank to authenticate certain documents.

13 Claims, 5 Drawing Sheets

(56) References Cited

U.S. PATENT DOCUMENTS

| | | | | |
|---|---|---|---|---|
| 2013/0297353 A1* | 11/2013 | Strange | ............... | G06Q 40/08 |
| | | | | 705/4 |
| 2013/0325728 A1* | 12/2013 | Bialostok | ............... | G06Q 10/06 |
| | | | | 705/311 |
| 2014/0055826 A1* | 2/2014 | Hinski | ............... | H04N 1/3876 |
| | | | | 358/473 |
| 2015/0358400 A1* | 12/2015 | Bartlett, II | ............ | H04L 63/126 |
| | | | | 709/201 |
| 2016/0104122 A1* | 4/2016 | Mande | ............... | G06Q 10/1095 |
| | | | | 705/7.19 |
| 2016/0210453 A1* | 7/2016 | Seo | ............... | G06F 21/32 |

OTHER PUBLICATIONS

Hsu et al., "Flexible Broadcasting of Scalable Video Streams to Heterogeneous Mobile Devices," IEEE Transactions on Mobile Computing Year: 2011 | vol. 10, Issue: 3 | Journal Article | Publisher: IEEE Cited by: Papers (19).*

\* cited by examiner

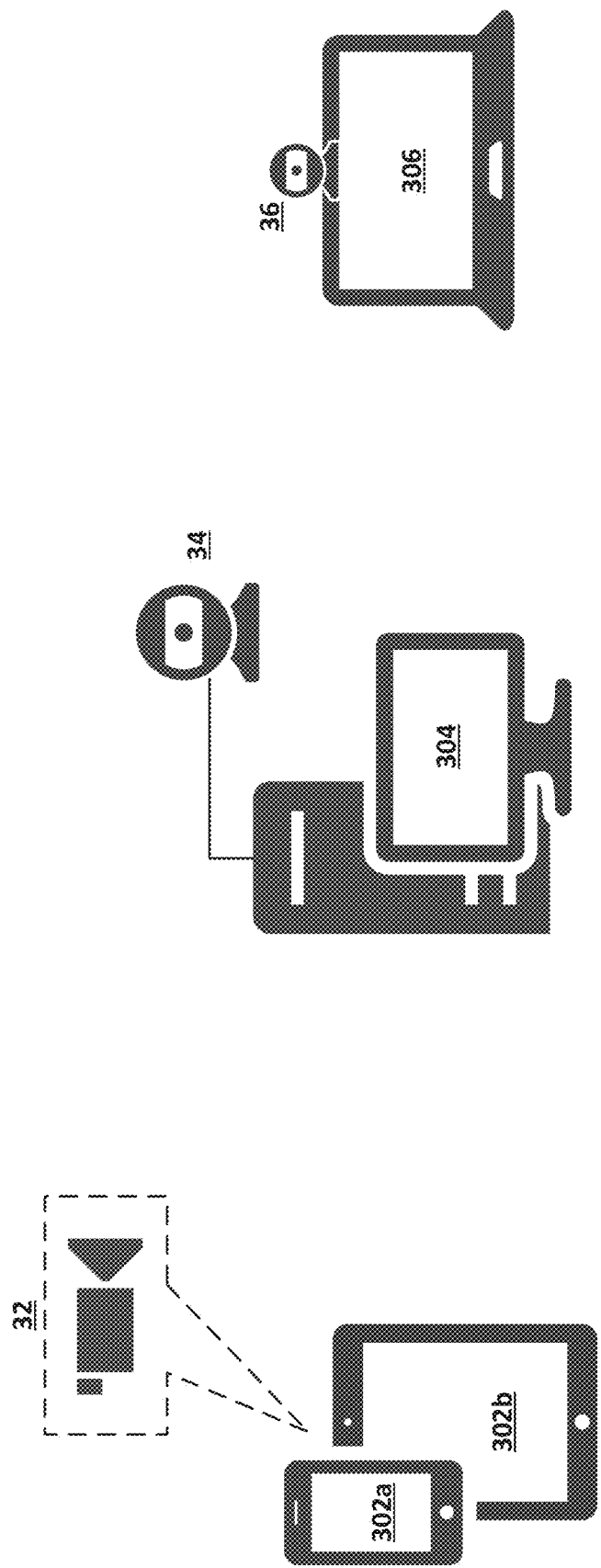

SYSTEMS AND METHODS FOR DOCUMENT AUTHENTICATION

CROSS-REFERENCE OF RELATED APPLICATION(S)

The present application claims priority to, and the benefits of, U.S. Provisional Application No. 62/096,542, filed on Dec. 24, 2014 with the same title, which is incorporated herein by reference in its entirety.

TECHNICAL FIELD

Embodiments of the present invention are related generally to systems and methods for document authentication, and, more particularly, to document authentication techniques based on video captures.

BACKGROUND OF THE INVENTION

With the fast development and wide-spread adoption of computing and telecommunication technologies, many consumer business transactions can now be conducted over the Internet and/or telephone without requiring a customer to physically visit any business premises. Consumers can now easily go online to purchase goods and services, issue bill payments, and handle their investments, for example. So long as a networked computer or mobile device is available, a consumer could accomplish so much without traveling at all.

However, there are exceptions to such freedom and convenience afforded by the Internet technology. For example, certain banking and financial services transactions still require the physical presence of the customers involved, such as for account opening or mortgage approval. Often a customer is asked to come visit a banking branch or loan office just to present a valid identification (e.g., a driver license or passport) or show possession of certain legal documents (e.g., a deed or certificate). While it may be imperative for a financial institution to verify a customer's true identity and/or confirm the authenticity of certain documents, it may be quite inconvenient for the customer to physically travel somewhere and meet someone during business hours. Existing or prospective customers might delay or even forego the required visits, causing the requisite authentication to be unfulfilled and sometimes even a loss of customer relationship or business opportunities.

It has been noticed that consumers tend to have a "sticky" relationship with a bank managing their checking and savings accounts. While it is often easy to lure a consumer to switch from using one credit card of a first issuer to using another credit card of a second issuer, it is extremely difficult to persuade a banking customer to transfer his or her checking or savings accounts from one bank to another or simply establish a new account with a different bank. Part of the reason is that the opening of a new bank account (also known as "client onboarding") would typically require a new account-holder to visit a local banking branch at least once, for example, to show multiple forms of identification and proof of address or employment. Considered by many as an unnecessary hassle, the conventional account-opening procedures may have prevented banking customers from switching banks or establishing new accounts more frequently.

The above-described requirements for the physical presence of a customer may be perceived as particularly inconvenient by the younger generation of banking customers who have got used to conducting business online rather than in person. The younger generation, however, is where business opportunities are most abundant.

Consumer banks have made tremendous efforts to offer convenience to banking customers, allowing them to access account information, deposit checks, and/or transfer funds remotely from networked computing devices. Such convenience also comes with a higher risk of fraud and security breaches. For instance, someone other than an authorized accountholder may gain access and steal funds; counterfeit checks or fake check images may be deposited. Thus, banks may find themselves in a dilemma: on the one hand it is desirable to grant remote access to customers without "seeing" them or their documents; on the other hand, the lack of "seeing" puts the banks themselves at risk.

Other problems and drawbacks also exist in prior customer authentication and checkout methods.

BRIEF SUMMARY OF THE INVENTION

Embodiments of the present invention are directed to improved techniques for video-based document authentication which overcome at least some of the above-mentioned problems and drawbacks in the prior art.

According to some embodiments, at least one processor of a personal computing device may be programmed to perform the following: enabling a video capture element on or coupled to said personal computing device; outputting, via said personal computing device, one or more instructions for a user to present a document to said video capture element in a specified manner; capturing, by said video capture element, the presentation of said document to generate a file, the captured presentation showing at least one identifiable feature of said document useful for its authentication; and transmitting said file to a computer server.

According to one embodiment of the present invention, a computer readable medium may comprise code for document authentication as described herein. The code may comprise instructions executable by at least one processor of a personal computing device to perform the method described above.

According to other embodiments, a computer-implemented method for document authentication may comprise the steps of: generating, by a central computer, one or more instructions for a remotely situated user to present a document in a specified manner to a video capture element coupled to a personal computing device and capture the presentation of said document in a video format showing at least one identifiable feature of said document useful for its authentication; causing said one or more instructions to be outputted on said personal computing device; and receiving, from said personal computing device, at least one file generated from the captured presentation.

One technical effect and advantage of the present invention is the locally or remotely generated instruction(s) which may be adapted to the type of documents to be authenticated and their particular features to be captured.

Another technical effect and advantage of the present invention is the interactive nature of the instruction(s) which guide a user through a specified video capture sequence to suit document authentication needs.

Yet another technical effect and advantage of the present invention is the tremendous convenience for customers as well as cost savings for businesses due to the avoidance of customer visits and in-person meetings previously required just for document authentication.

Additional features and advantages of the invention will be set forth in the description that follows, and in part will be apparent from the description, or may be learned by practice of the invention.

BRIEF DESCRIPTION OF THE DRAWINGS

The purpose and advantages of the present invention will be apparent to those of skill in the art from the following detailed description in conjunction with the appended drawings wherein:

FIG. 3 shows block diagrams illustrating exemplary hardware setup for document authentication in accordance with embodiments of the invention;

The accompanying drawings are included to provide a fuller understanding of the invention and are incorporated in and constitute part of this specification. Not to be construed as limitations on the claimed invention(s), these drawings illustrate several exemplary embodiments of the invention and, together with the description, serve to explain the principles of the invention more clearly to one of ordinary skill in the art.

DETAILED DESCRIPTION OF PREFERRED EMBODIMENTS

Embodiments of present invention are directed to document authentication based on video captures. Instructions may be generated to guide a remotely situated customer through an authentication process in which the customer presents a document (e.g., a driver license, passport, or payment card) to a video capture element of a personal computing device (e.g., a smart phone or tablet computer) in a specified manner so that identifiable feature(s) of that document can be captured in a video file. The video file may then be uploaded to a central server for further processing or archiving. The instructions that guide the customer through the document authentication steps may be either generated locally on the personal computing device via a mobile application or delivered from a remote computer via an Internet browser.

Figure 1:
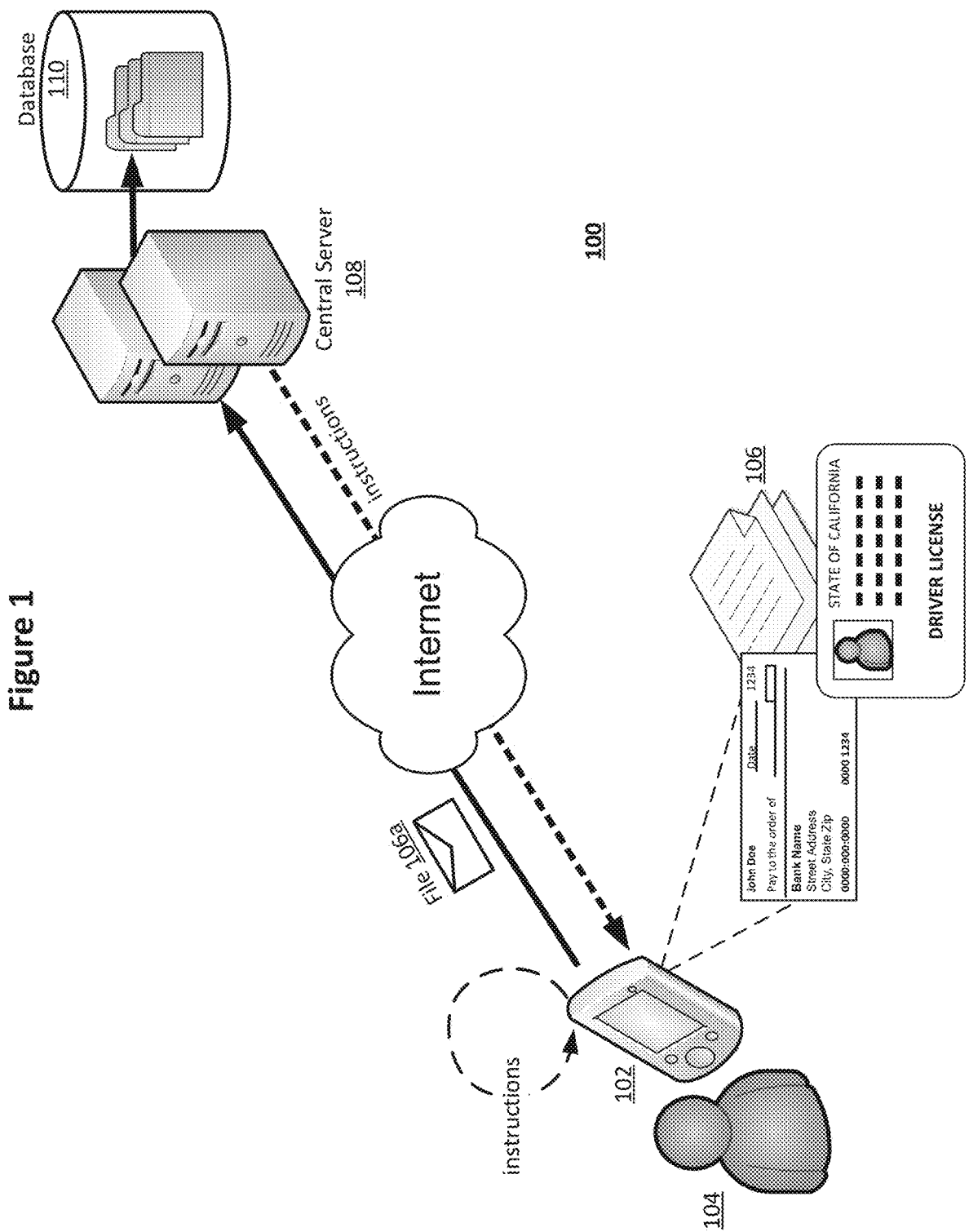
FIG. 1 is a block diagram illustrating an exemplary document authentication scheme in accordance with embodiments of the invention.

Referring to FIG. 1, there is shown a block diagram illustrating an exemplary document authentication scheme in accordance with embodiments of the invention.

As shown, the exemplary document authentication scheme is implemented based on computing equipment. Generally, it should be noted that the components depicted and described herein may be, or include, a computer or multiple computers. Although the components are sometimes shown as discrete units, they may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types. For example, a server may comprise a single server or a group of servers used to service users. Additionally, a server may comprise a front-end web server and a back-end database server. Alternatively, those functions can be integrated into a single server device.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computing devices (e.g., mobile devices, lap-tops, desktops, etc.) typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or Apple iOS operating systems, Google Android operating system (and variations thereof), Microsoft Windows® operating system (desktop and/or mobile version), the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system or platform.

User applications may be so-called stand-alone applications executing on user devices or they may be client-server type applications that interface with server-side components. They may include applications provided by the server, such as Java Applets, that may be delivered with web pages.

The memory will include at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described herein and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, processor, CPU (Central Processing Unit), programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It is appreciated that in order to practice the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described herein is performed by various components and various memories. However, it is appreciated that the processing performed by two distinct components as described herein may, in accordance with a further embodiment of the invention, be performed by a single component. Further, the processing performed by one distinct component as described herein may be performed by two distinct components. In a similar manner, the memory storage performed by two distinct memory portions as described herein may, in accordance with a further embodiment of the invention, be performed by a single memory portion. Further, the memory storage performed by one distinct memory portion as described herein may be performed by two memory portions, for example.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. Input devices include those that recognize hand movements or gestures, such as in the case of gesture set supported by Android or the swipe movements recognized in iOS-based devices. These and other input devices are often connected to the processing unit through a user input interface that is coupled to the system bus, but may be connected by other interface and bus structures, such as a parallel port, game port or a universal serial bus (USB).

A user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described herein.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Specifically, the video-based document authentication scheme may be implemented with at least a personal computing device 102. Although shown illustratively as a handheld computing device, the personal computing device 102 may be any of a desktop or laptop computer, a tablet computer, a mobile device such as a smart phone or personal digital assistant (PDA), or other type of computing device, so long as it has networking and video capture capabilities. The personal computing device 102 is remotely situated with respect to a central server 108, but they can communicate with each other via Internet. The central server 108 may be operated by a private business organization (e.g., a bank, stock broker, retail store, or pharmacist) or government agency (e.g., IRS or law enforcement), whereas a user 104 may be a customer of the organization or agency.

In operation, when there arises a need for customer 104 to authenticate certain document(s) to the organization or agency, the personal computing device 102 may enable its video capture element (e.g., a built-in camera device or external video camera) and output instructions to guide the customer 104 to present one or more documents 106 for video capture. The document(s) 106 may be any of photo IDs, checks, deposit slips, store receipts, concert tickets, drug prescriptions, and official papers, for example. The instructions may be generated locally by the personal computing device 102 or delivered from the central server 108 to the personal computing device 102. As directed by the instructions, the customer 104 may hold and/or move each document 106 in a specified manner in front of the video capture element, such that certain identifiable features of the document 106 may be recorded into a video file. After some processing by the personal computing device 102, a file 106a containing the video file and other relevant information may be transmitted, either as an attachment to an electronic communication or via a direct upload, to the central server 108. Upon receiving the file 106a, the central server 108 may verify the file and/or perform further processing before storing it and/or its related data into a database 110.

Thus, by operating the central server 108 and database 110, a business organization or government agency may be able to authenticate the document(s) 106 held by the customer 104 without requiring the customer to physically come in for a meeting or to bring or mail in the documents. Not only is this convenient to the customer, but it also cost savings for both the customer and the party requesting the authentication.

Figure 2:
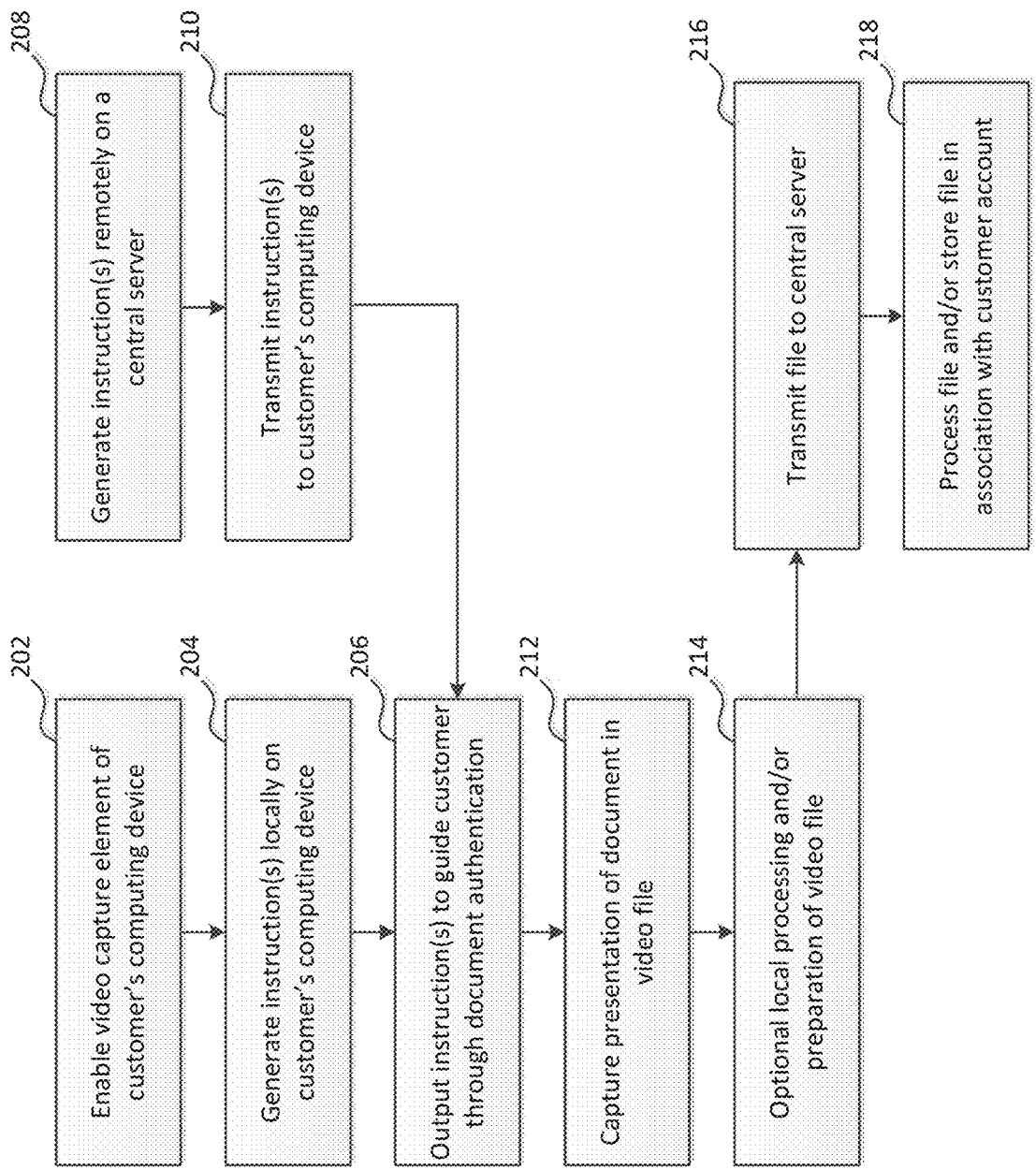
FIG. 2 is a flow chart illustrating an exemplary method for document authentication in accordance with an embodiment of the invention.

Referring now to FIG. 2, there is shown a flow chart illustrating an exemplary method for document authentication in accordance with an embodiment of the invention. For ease of illustration (but not intended as limitations), the exemplary method described below will take a banking customer as an example and walk through a video-based document authentication process in connection with a central server operated by or on behalf of a consumer bank. It should be appreciated by those skilled in the art that the methodology may be applicable to a number of other scenarios involving a variety of organizations or entities.

In Step 202, a video capture element may be enabled on a customer's computing device. The video capture element may be a digital camera head built into the customer's personal computing device or an external video camera coupled to the computing device.

As shown in FIG. 3, various hardware setup options may be adopted for video-based document authentication in accordance with embodiments of the invention. For example, the customer's personal computing device may be either a smart phone 302a (e.g., iOS or Android devices) or a tablet computer 302b (e.g., Apple iPad, Google Nexus 7 or 9, or Windows Surface) which has at least one integrated digital camera device 32 with video capture functions. For another example, the customer's personal computing device may be a personal computer 304 (e.g., a Windows desktop or Apple iMac) with a built-in or externally connected web camera 34. As another alternative, the customer's personal computing device may be a laptop or notebook computer 306 (e.g., Apple MacBook, Windows-based notebook, or Google Chromebook) with a built-in or externally connected web camera 36. It may be necessary for the video capture element have a minimal image resolution and support a video format compatible with subsequent processing and transmission. The customer's personal computing device should have at least sufficient storage space to accommodate the video file(s) to be generated.

Referring back to FIG. 2, in Step 204, one or more document authentication instructions may be generated locally on the customer's personal computing device. On the customer's personal computing device may be installed a banking software such as a proprietary mobile Internet banking app provided by the exemplary consumer bank. For example, the banking app may require the authentication of a paper check when the customer attempts to deposit the check by capturing the check image. Or, the banking app may require the authentication of a driver license when the customer attempts another transaction. In these scenarios, the banking app may become aware of the needs for document authentication (e.g., based on built-in business rules)

and automatically prompt the customer to perform the authentication. Other banking scenarios may also require document authentication.

According to alternative embodiments of the present invention, the document authentication instruction(s) may be generated remotely, in Step 208, on a central server such as the bank's Internet banking web server. For example, it may be in the context of the customer conducting Internet banking when the need for document authentication arises or the customer is notified of it.

Then, in Step 210, the instruction(s) may be transmitted from the central server to the customer's personal computing device. For example, an electronic message may be sent to the customer, for example, via an email message, a text message, or a push notification (via mobile app). The electronic message itself may carry the instruction(s), or it may include a URL link to the instruction(s) or simply cause the customer's personal computing device or its banking app to retrieve the instruction(s) from the server.

Next, in Step 206, the instruction(s) may be outputted to guide the customer through a document authentication process. The instruction(s) may include step-by-step requests for the customer to retrieve a selected document and present it in a specified manner to the video capture element.

Figure 4B:
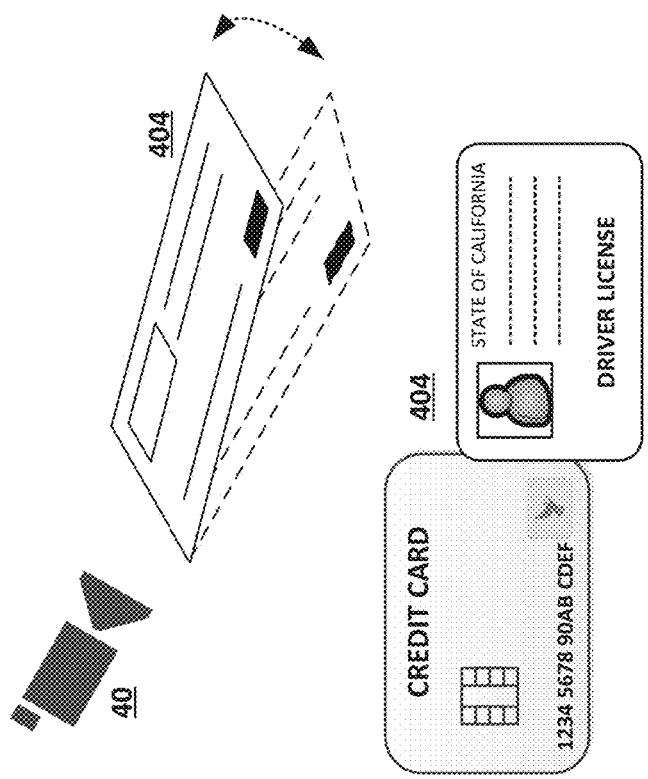
FIGS. 4A-4C illustrate exemplary video capture methods for document authentication in accordance with an embodiment of the invention.
Figure 4A:
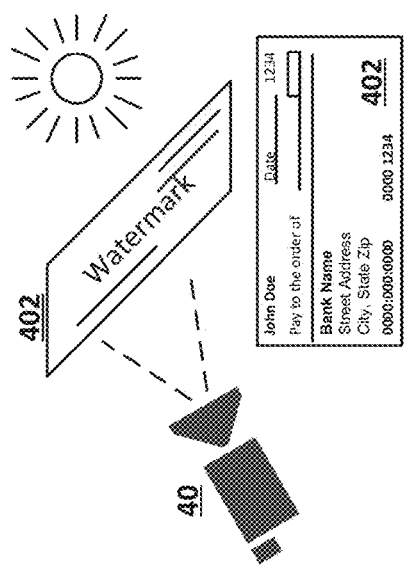
Figure 4C:
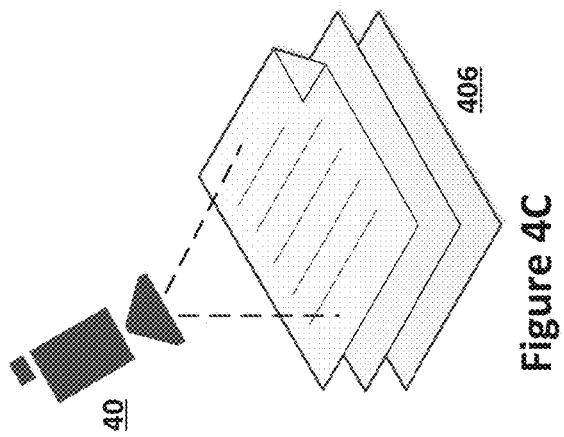

Depending on the particular type of document to be authenticated and the critical document features of interest, the instructions for the video capture may be quite different. FIGS. 4A-4C illustrate exemplary video capture methods for document authentication in accordance with an embodiment of the invention.

In FIG. 4A, the document to be authenticated is a paper check 402 having anti-counterfeiting watermarks which are only visible if the check is held against a bright light. Accordingly, apart from obtaining full front and back views of the check 402, the instructions for video-based authentication of the check 402 are for the customer to position the check between the video capture element 40 and a bright light source (e.g., the sun, a desk lamp, or a flashlight), for example, by maneuvering the check 402 with respect to the video capture element 40 or vice versa. Other or additional steps of the video capture of a check may include taking a close-up of a micro-text printed area (e.g., with the help of a magnifying glass), tilting the check under light to reveal a shifting of color pattern, and holding a part of the check with the customer's warm hand to reveal a heat-induced, temporary color change.

In FIG. 4B, the document to be authenticated is a credit card or driver license 404 which may contain surface features (e.g., hologram or hidden imprints) only visible from certain viewing angle(s). Accordingly, apart from obtaining full front and back views of the card(s) 404, the instructions for video-based authentication of the payment card or ID 404 are for the customer to position it in front of the camera lens of the video capture element 40 and slowly tilt the card 404 so that the hologram or hidden imprints become visible to the camera lens at some point during the tilting procedure. The customer may be instructed to tilt the card and capture the surface features near a light source such that ample light reflects off of the card surface. At the end of the procedure, the customer may also be instructed to verify the captured video to ensure that the surface features of interest are clearly visible in the captured video.

According to some embodiments of the present invention, when authenticating a photo ID, the customer may also be asked to hold the ID card next to his/her head such that the face is juxtaposed with the photograph on the ID card. Alternatively, the customer may be asked to take a fresh photograph of himself/herself (i.e., a "selfie") and submit that photograph along with the subsequently captured video.

In FIG. 4C, the document to be authenticated is a multi-page paper 406. The instructions for video-based authentication of the paper 406 may be for the customer to slowly flip through it while positioning the video capture element 40 directly over the paper 406, such that each sheet comes into full view of the camera lens. Subsequent image processing and optical character recognition (OCR) may be performed, if necessary, to extract the content of the multi-page paper 406.

Preferably, the instruction(s) are outputted in a clear, informative, and interactive fashion. According to one preferred embodiment of the present invention, the instructions may be in audio and/or video format which explains what exactly the customer has to be do in each step. Alternatively, the instructions may be shown in text and/or static image format on the screen of the customer's personal computing device. As the customer completes each step, the instructions may proceed to the next step either automatically or at the customer's request (e.g., upon a click of a "Next" button on the screen or at the customer's voice command).

Returning again to FIG. 2, in Step 212, as the customer follows the instructions to present the document to the video capture element, the presentation may be captured into a video file. The video may be captured in segments (e.g., for each step of the authentication procedure) or continuously. The video file may be any of the common formats such as AVI, MPEG-4, Windows Media Video (WMV), or Quick-Time (.mov or .qt). The captured video may include audio or could be completely silent.

In Step 214, the video file may undergo optional local processing and/or preparation on the customer's personal computing device. For example, the video file may be examined for error, trimmed to leave only the most essential portion, compressed (if not already), packaged with other data such as identification of the customer or account thereof, and/or encrypted for secure transmission.

In Step 216, the resulting file from Step 214 (including the captured video of the document presentation) may be transmitted to the bank's central server. The customer may be prompted to locate the file and upload it to the server or attach it to an email or text message to the bank. Alternatively and more preferably, the uploading or mailing of the file may be automated by the customer's computing device or banking app thereon, without the customer's participation.

Finally, in Step 218, the file may be processed by the bank and stored in association with the customer's account. The processing of the file may be performed by the bank's personnel and/or computer(s), for example, to decompress the video file, check its integrity and perform any error correction as needed, and verify its content (e.g., presence of certain document features). The processed video file and related metadata may then be archived in association with the customer's account data.

Figure 5:
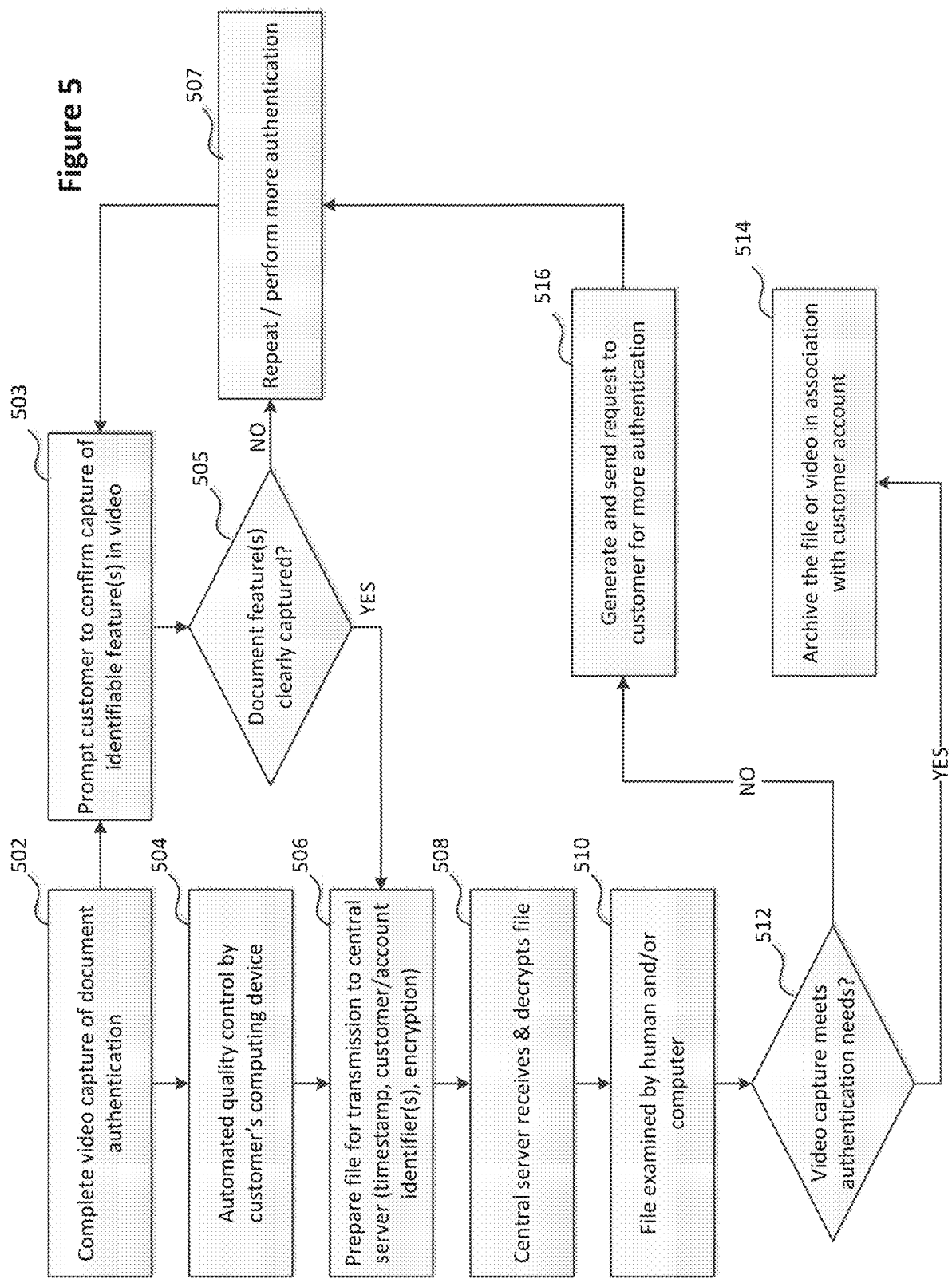
FIG. 5 is a flow chart illustrating an exemplary method for processing video-captured document authentication file in accordance with an embodiment of the invention.

Referring now to FIG. 5, there is shown a flow chart illustrating an exemplary method for processing video-captured document authentication file in accordance with an embodiment of the invention.

In Step 502, the video capture of a document authentication procedure may be completed, for example, by a customer user in accordance with instructions as described above. The captured video may now be in at least one freshly created video file.

In Step 504, the video file may undergo automated quality control by the customer's computing device. For example, the length, format, and image quality of the video file may be automatically checked.

Alternatively or additionally, the customer may be prompted, in Step 503, to confirm successful capture of one or more identifiable features of the document to be authenticated. Such document features may include but are not limited to: watermarks, surface textures, reflective features, diffractive features, holograms, numbers, texts, symbols, icons, or images, imprints or engravings, color patterns, micro-text printing, UV printing, and media shape and dimensions.

If it is determined, in Step 505, that any document feature of interest has not been clearly captured, the process may branch to Step 507 where the document authentication procedure and its video capture may be repeated to ensure the critical feature(s) can be caught on video. Thereafter, the process may loop back to Step 503 (or Step 502).

If it is confirmed, in Step 505, that all the critical document features have been clearly captured in the video file, then the process may proceed to Step 506.

In Step 506, a file may be prepared for transmission to a central server. For example, the captured video file may be processed to apply a timestamp, add customer or account identifier(s), and protect it with encryption. As mentioned above, for transmission to the central server, the file may be either directly uploaded or attached to another electronic communication sent to the server.

In Step 508, the central server may receive the file (e.g., in a direct upload or from a message attachment) and decrypt it to retrieve the captured video file and any other related data.

In Step 510, the video file may be examined by a human operator and/or a computer.

In Step 512, it may be determined whether the captured video meets all the authentication needs or requirements. If so, then, in Step 514, the received file or video may be archived in association with the customer's account.

If the captured video fails to meet the authentication needs, then, in Step 516, the central server may generate and send a request to the customer for more authentication. This request may or may not include additional instructions for the additional or repeated document authentication procedure. The process may then loop back to Step 507 for the customer to repeat or perform more authentication as requested.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method comprising:
    enabling, by a computing device, a video capture element on or coupled to the computing device;
    outputting, by the computing device, instructions to present the document to the video capture element in the specified manner, the instructions varying a video capture sequence of images to suit authentication of at least one security feature of the document based on one of a plurality of types of transactions being requested;
    capturing, by the video capture element and according to the video capture sequence, the presentation of the document to generate a video file, the captured presentation showing the at least one security feature of the document useful for the authentication, wherein the security feature of the document includes one or more holograms and one or more surface textures, and wherein the one or more instructions is received via a uniform resource locator (URL) link that directs manipulation of the document so that the video capture element can capture the one or more holograms and the one or more surface textures of the document;
    prompting a user, by the computing device, after generating the video file, to confirm successful capture of the one or more holograms and the one or more surface textures of the document; and
    transmitting the video file to a computer server to facilitate the authentication of the document based on the confirmation of the one or more holograms and the one or more surface textures.

2. The method of claim 1, further comprising:
    receiving confirmation of authentication based on a photo or video capture in connection with the capturing of the presentation of the document.

3. The method of claim 2, further comprising associating the video file with an identity of the customer.

4. The method of claim 1, wherein the one or more instructions comprise step-by-step guidance in a visual or audible format.

5. The method of claim 1, wherein the video file comprises information about an associated user or the document in addition to a video of the captured presentation.

6. The method of claim 1, further comprising timestamping the video file or the captured presentation.

7. The method of claim 1, further comprising examining the video file for quality control prior to the transmitting.

8. The method of claim 1, further comprising securing the video file for transmission to the computer server.

9. The method of claim 1, wherein the video capture element comprises:
    a digital camera module integrated in the computing device; or
    a digital camera device or a web camera coupled to the computing device.

10. The method of claim 1, wherein the one or more instructions are generated locally the computing device and output via a user interface of an application running on the computing device.

11. The method of claim 1, wherein the one or more instructions are received from a central server and output via an Internet browser or a user interface of an application running on the computing device.

12. A non-transitory computer readable medium having stored thereon instructions for document authentication comprising executable code which when executed by one or more processors, causes the one or more processors to:
    enable a video capture element;
    one or more instructions to present a document to the video capture element in a specified manner, the one or more instructions varying a video capture sequence to suit at least one security feature of the document based on one of a plurality of types of transactions being requested;

output instructions to present the document to the video capture element in the specified manner, the instructions varying a video capture sequence of images to suit authentication of at least one security feature of the document based on one of a plurality of types of transactions being requested;

capture according to the video capture sequence, the presentation of the document to generate a video file, the captured presentation showing the at least one security feature of the document useful for the authentication, wherein the security feature of the document includes one or more holograms and one or more surface textures, and wherein the one or more instructions is received via a uniform resource locator (URL) link that directs manipulation of the document so that the video capture element can capture the one or more holograms and the one or more surface textures of the document;

prompt a user, after generation of the video file, to confirm successful capture of the one or more holograms and the one or more surface textures of the document; and transmit the video file to a computer sever to facilitate the authentication of the document based on the confirmation of the one or more holograms and the one or more surface textures.

13. A computing device comprising a processor and a memory coupled to the processor which, when executing programmed instructions stored in the memory, is configured to:

enable a video capture element;

output instructions to present a document to the video capture element in a specified manner, the instructions varying a video capture sequence of images to suit authentication of at least one security feature of the document based on one of a plurality of types of transactions being requested;

capture according to the video capture sequence, the presentation of the document to generate a video file, the captured presentation showing the at least one security feature of the document useful for the authentication, wherein the security feature of the document includes one or more holograms and one or more surface textures, and wherein the instructions is received via a uniform resource locator (URL) link that directs manipulation of the document so that the video capture element can capture the one or more holograms and the one or more surface textures of the document;

prompt a user, after generation of the video file, to confirm successful capture of the one or more holograms and the one or more surface textures; and transmit the video file to a computer sever to facilitate the authentication of the document based on the confirmation of the one or more holograms and the one or more surface textures.

* * * * *